United States Patent
Noda

(10) Patent No.: US 11,926,734 B2
(45) Date of Patent: Mar. 12, 2024

(54) RUBBER COMPOSITION FOR TIRES AND PNEUMATIC TIRE

(71) Applicant: Toyo Tire Corporation, Itami (JP)

(72) Inventor: Asuka Noda, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/840,897

(22) Filed: Jun. 15, 2022

(65) Prior Publication Data

US 2022/0403142 A1    Dec. 22, 2022

(30) Foreign Application Priority Data

Jun. 22, 2021 (JP) ................. 2021-103667

(51) Int. Cl.
*C08L 7/00* (2006.01)
*B60C 1/00* (2006.01)

(52) U.S. Cl.
CPC .............. *C08L 7/00* (2013.01); *B60C 1/0016* (2013.01); *C08L 2205/025* (2013.01); *C08L 2205/03* (2013.01)

(58) Field of Classification Search
CPC .. C08L 7/00; C08L 2205/025; C08L 2205/03; B60C 1/0016
See application file for complete search history.

(56) References Cited

U.S. PATENT DOCUMENTS

2021/0178814 A1*  6/2021  Sumino ................... C08F 36/06

FOREIGN PATENT DOCUMENTS

| | | | |
|---|---|---|---|
| EP | 3 733 758 A1 | 11/2020 | |
| EP | 3 795 628 A1 | 3/2021 | |
| JP | 2011-94013 A | 5/2011 | |
| JP | 5389527 B2 * | 1/2014 | |
| JP | 2018-177836 A | 11/2018 | |
| JP | 2019-199536 A | 11/2019 | |
| JP | 2021031557 A * | 3/2021 | ........... B60C 1/0016 |
| WO | 2019/131390 A1 | 7/2019 | |

OTHER PUBLICATIONS

English machine translation for JP 5389527 (Year: 2014).*
English machine translation for JP 2021-031557 (Year: 2021).*

* cited by examiner

*Primary Examiner* — Angela C Scott
(74) *Attorney, Agent, or Firm* — WHDA, LLP

(57) ABSTRACT

Provided are a rubber composition for tires and a pneumatic tire, which are excellent in braking performance on ice and failure properties. The rubber composition for tires includes, per 100 parts by mass of a solid rubber component, 1 to 20 parts by mass of a liquid polybutadiene having a glass transition temperature of −80° C. or less and 1 to 30 parts by mass of vegetable granules having a particle size of 0.1 to 500 μm.

14 Claims, No Drawings

RUBBER COMPOSITION FOR TIRES AND PNEUMATIC TIRE

BACKGROUND OF THE INVENTION

1. Field of the Invention

The present invention relates to a rubber composition for tires and also to a pneumatic tire.

2. Description of the Related Art

Pneumatic tires are required to have improved grip performance on icy road surfaces (braking performance on ice), and WO 2019/131390, JP-A-2019-199536, JP-A-2018-177836, and JP-A-2011-94013 (Patent Literatures 1 to 4) describe rubber compositions containing liquid polymers.

SUMMARY OF THE INVENTION

In addition, when the tread of a pneumatic tire is broken, the grip force decreases. Thus, a rubber composition used for the tread is required to have excellent failure properties.

However, use of vegetable granules is not described in Patent Literatures 1 to 4, and there has been room for improvement in braking performance on ice. In addition, there has also been no mention of failure properties.

In light of the above points, an object of the invention is to provide a rubber composition for tires and a pneumatic tire, which are excellent in braking performance on ice and failure properties.

According to an aspect of the invention, there is provided a rubber composition for tires, which includes, per 100 parts by mass of a solid rubber component, 1 to 20 parts by mass of a liquid polybutadiene having a glass transition temperature of −80° C. or less and 1 to 30 parts by mass of vegetable granules having a particle size of 0.1 to 500 μm.

It is possible that the liquid polybutadiene has a weight average molecular weight of 5,000 to 50,000.

It is possible that the liquid polybutadiene has a microstructure having a cis-structure content of 40 mass % or less and a trans-structure content of 50 mass % or more.

It is possible that the solid rubber component contains 40 to 80 mass % of natural rubber or isoprene rubber and 20 to 60 mass % of butadiene rubber.

According to another aspect of the invention, there is provided a pneumatic tire made using the rubber composition for tires described above for a tread.

According to aspects of the invention, a rubber composition for tires and a pneumatic tire, which are excellent in braking performance on ice and failure properties, can be provided.

DESCRIPTION OF EMBODIMENTS

Hereinafter, matters relevant to the implementation of the invention will be described in detail.

A rubber composition for tires according to this embodiment includes, per 100 parts by mass of a solid rubber component, 1 to 20 parts by mass of a liquid polybutadiene having a glass transition temperature of −80° C. or less and 1 to 30 parts by mass of vegetable granules having a particle size of 0.1 to 500 μm.

The rubber composition for tires according to this embodiment contains a solid rubber that is solid at room temperature (23° C.).

As solid rubbers, for example, natural rubber (NR), isoprene rubber (IR), butadiene rubber (BR), styrene butadiene rubber (SBR), styrene-isoprene copolymer rubbers, butadiene-isoprene copolymer rubbers, styrene-isoprene-butadiene copolymer rubbers, and the like can be mentioned. In addition, one that is a copolymer may be an alternating copolymer, a block copolymer, or a random copolymer. One of these solid rubbers may be used alone, or it is also possible to use a blend of two or more kinds. Among them, natural rubber, isoprene rubber, and butadiene rubber are preferable, and it is particularly preferable that 40 to 80 mass % of natural rubber or isoprene rubber and 20 to 60 mass % of butadiene rubber are contained.

The rubber composition for tires according to this embodiment contains a polybutadiene that is liquid at room temperature (23° C.). The liquid polybutadiene has a glass transition temperature of −80° C. or less, preferably −110° C. to −80° C.

The content of the liquid polybutadiene is, per 100 parts by mass of the solid rubber component, 1 to 20 parts by mass, preferably 5 to 20 parts by mass, and more preferably 5 to 10 parts by mass.

As the liquid polybutadiene, a commercially available product can also be utilized. For example, LBR-307 and LBR-305 manufactured by Kuraray Co., Ltd., etc., can be mentioned.

The weight average molecular weight of the liquid polybutadiene is preferably 5,000 to 50,000, and more preferably 10,000 to 30,000. Here, "weight average molecular weight" herein is a polystyrene-equivalent value determined by gel permeation chromatography (GPC) measurement. Specifically, using a differential refractive index detector (RI) as the detector and tetrahydrofuran (THF) as the solvent, calculation in terms of polystyrene can be done using commercially available standard polystyrene at a measurement temperature of 40° C., a flow rate of 1.0 mL/min, a concentration of 1.0 g/L, and an injection volume of 40 μL.

With respect to the contents of the cis-structure and trans-structure in the microstructure of the liquid polybutadiene, it is preferable that the cis-structure is 40 mass % or less, and the trans-structure is 50 mass % or more. The contents of the cis-structure and trans-structure in a microstructure herein are determined from the integral ratio of the $^{13}$C-NMR spectra.

As a reinforcing filler, carbon black and/or silica can be used. That is, the reinforcing filler may be carbon black alone, silica alone, or a combination of carbon black and silica. A combination of carbon black and silica is preferable. The content of the reinforcing filler is not particularly limited and is, for example, per 100 parts by mass of the solid rubber component, preferably 10 to 150 parts by mass, more preferably 20 to 100 parts by mass, and still more preferably 30 to 80 parts by mass.

The above carbon black is not particularly limited, and various known species can be used. The content of carbon black is, per 100 parts by mass of the solid rubber component, preferably 1 to 70 parts by mass, and more preferably 1 to 30 parts by mass.

Silica is not particularly limited either, but it is preferable to use wet silica, such as wet-precipitated silica or wet-gelled silica. In the case where silica is contained, the content thereof is, in view of the tan δ balance of the rubber, reinforcing properties, and the like, per 100 parts by mass of the solid rubber component, preferably 10 to 150 parts by mass, and more preferably 15 to 100 parts by mass.

In the case where silica is contained, a silane coupling agent, such as sulfide silane or mercapto silane, may further be contained. In the case where a silane coupling agent is contained, the content thereof is preferably 2 to 20 parts by mass based on the silica content.

The rubber composition for tires according to this embodiment contains, per 100 parts by mass of the solid rubber component, 1 to 30 parts by mass of vegetable granules having a particle size of 0.1 to 500 μm. The presence of vegetable granules within the above range makes it easier to obtain a pneumatic tire having excellent braking performance on ice.

As the vegetable granules, ground products of seed husks, fruit pits, grains and their core materials, and the like can be mentioned, and at least one kind thereof can be incorporated. For example, ground products of fruit pits and seed husks such as walnuts, apricots, camellias, peaches, plums, ginkgo nuts, peanuts, and chestnuts, ground products of grains such as rice, wheat, millet, Japanese millet, and corn, ground products of grain core materials such as corn cobs, and the like can be mentioned. They are harder than ice and thus can exert scratching effects on icy road surfaces. In order to improve compatibility with rubbers to prevent shedding, the vegetable granules used may have been surface-treated with a rubber adhesion improver. As the rubber adhesion improver, for example, one containing, as a main component, a mixture of a resorcin-formalin resin initial condensate and latex (RFL liquid) can be mentioned.

The particle size of the vegetable granules is 0.1 to 500 μm, preferably 10 to 500 μm, and still more preferably 100 to 500 μm. Here, the particle size herein is measured by a laser diffraction/scattering method.

The rubber composition according to this embodiment contains the vegetable granules and the liquid polybutadiene and thus offers excellent braking performance on ice and failure properties. This mechanism is not clear, but can be surmised as follows. That is, presumably, as a result of incorporating vegetable granules that are harder than ice, scratching effects are exerted on icy road surfaces, whereby the braking performance on ice improves, while as a result of incorporating a liquid polybutadiene having a predetermined glass transition temperature, the rubber component is plasticized to improve the dispersibility of the vegetable granules, whereby the failure properties improve.

As cross-linking formulation agents, vulcanizing agents and vulcanization accelerators can be mentioned. As vulcanizing agents, sulfur components such as powder sulfur, precipitated sulfur, colloidal sulfur, insoluble sulfur, and highly dispersed sulfur can be mentioned. The content thereof is, per 100 parts by mass of the solid rubber component, preferably 0.1 to 4 parts by mass, and more preferably 0.2 to 3 parts by mass.

As vulcanization accelerators, sulfenamide-based vulcanization accelerators, thiuram-based vulcanization accelerators, thiazole-based vulcanization accelerators, thiourea-based vulcanization accelerators, guanidine-based vulcanization accelerators, dithiocarbamate-based vulcanization accelerators, and the like can be mentioned.

The vulcanization accelerator content is, per 100 parts by mass of the solid rubber component, preferably 0.1 to 7 parts by mass, and more preferably 0.5 to 5 parts by mass.

As formulation agents other than cross-linking formulation agents, formulation chemicals used in the usual rubber industry, such as process oils, processing aids, zinc oxide, stearic acid, softeners, plasticizers, resins, waxes, and antioxidants, can be suitably incorporated within the usual range.

The rubber composition according to this embodiment can be used for tires, and is applicable to various areas of a tire, such as the treads and sidewalls of pneumatic tires of various sizes for various applications, including tires for passenger cars, large-sized tires for trucks and buses, and the like. Use for the tread of a stud-less tire is particularly preferable. The rubber composition is formed into a predetermined shape in the usual manner, for example by extrusion, then combined with other parts, and vulcanization-molded at 140 to 180° C., for example, whereby a pneumatic tire can be produced.

The kind of pneumatic tire according to this embodiment is not particularly limited, and various tires including tires for passenger cars, heavy-load tires for trucks, buses, and the like, and the like can be mentioned.

EXAMPLES

Hereinafter, examples of the invention will be shown, but the invention is not limited to these examples.

Using a Banbury mixer, first, in the non-processing kneading step (first mixing stage), components excluding a vulcanization accelerator and sulfur were added and kneaded (discharge temperature=160° C.) following the formulation shown in Table 1 below (parts by mass). To the obtained kneaded product, in the processing kneading step (final mixing stage), a vulcanization accelerator and sulfur were added and mixed (discharge temperature=90° C.), thereby preparing a rubber composition.

Details of each component in Table 1 are as follows.

Natural rubber: RSS #3
Butadiene rubber: "BR150B" manufactured by Ube Industries, Ltd.
Carbon black: "SEAST 6" manufactured by Tokai Carbon Co., Ltd.
Zinc oxide: "Type 2 Zinc Oxide" manufactured by Mitsui Mining & Smelting Co., Ltd.
Stearic acid: "Beads Stearic Acid" manufactured by NOF Corporation
Vegetable granules 1: "Soft Grit #80" manufactured by Nippon Walnut Co., Ltd., particle size=149 to 210 μm
Vegetable granules 2: "Soft Grit #60" manufactured by Nippon Walnut Co., Ltd., particle size=200 to 300 μm, surface-treated with an RFL treatment liquid according to the method described in JP-A-10-7841, paragraph 0015.
Aromatic oil: "PROCESS NC140" manufactured by ENEOS Corporation
Liquid polymer 1: "LBR-305" manufactured by Kuraray Co., Ltd., polybutadiene, weight average molecular weight=26,000, Tg=−95° C., cis-structure content in microstructure=38.8 mass %, trans-structure content=52.7 mass %, vinyl structure content=8.5 mass %
Liquid polymer 2: "LBR-307" manufactured by Kuraray Co., Ltd., polybutadiene, weight average molecular weight=8,000, Tg=−95° C., cis-structure content in microstructure=35.5 mass %, trans-structure content=50.0 mass %, vinyl structure content=14.5 mass %
Liquid polymer 3: "LIR-30" manufactured by Kuraray Co., Ltd., polyisoprene, weight average molecular weight=28,000, Tg=−63° C., cis-structure content in microstructure=67.5 mass %, trans-structure content=26.0 mass %, vinyl structure content=6.5 mass %
Liquid polymer 4: "B-3000" manufactured by Nippon Soda Co., Ltd., polybutadiene, weight average molecular weight=3,200, Tg=−15° C., cis-structure content in microstructure=0 mass %, trans-structure content=11.6 mass %, vinyl structure content=88.4 mass %

Antioxidant: "NOCRAC 6C" manufactured by Ouchi Shinko Chemical Industrial Co., Ltd.

Sulfur: "Powder Sulfur" manufactured by Tsurumi Chemical Industry Co., Ltd.

Vulcanization accelerator: "SOXINOL CZ" manufactured by Sumitomo Chemical Co., Ltd., sulfenamide-based vulcanization accelerator The braking performance on ice and Failure Properties 1 and 2 of each obtained rubber composition were evaluated. The evaluation methods are as follows.

Braking performance on ice: Four tires with a tire size of 11R22.5 14PR were mounted on a 25-ton truck and run on a −3±3° C. icy road at 30 km/h, and sudden braking was then applied (ABS not activated). The braking distance (m) was measured, and its reciprocal was taken. The reciprocal of the braking distance (average where n=10) thus obtained was compared and expressed as an index taking the value in Comparative Example 1 as 100. The larger the index, the shorter the braking distance, indicating better braking performance on ice.

Failure Property 1: The breaking strength (MPa) and elongation at break (%) of a vulcanized rubber obtained from a sample made using a JIS No. 3 dumbbell were measured in accordance with JIS K6251, and, from the measured values, Failure Property 1, which is determined as (breaking strength)×(elongation at break), was calculated. The evaluation was expressed as an index evaluation taking the Failure Property 1 in Comparative Example 1 as 100. A larger index indicates better Failure Property 1.

Failure Property 2: A sample punched into the crescent shape specified in JIS K6252 and provided with a 0.50±0.08-mm cut in the center of the depression was subjected to a tensile test to determine tear strength. The result was expressed as an index taking the stress in Comparative Example 1 as 100. A larger index indicates better Failure Property 2.

Comparative Example 2 is an example where a liquid polymer was contained over the upper limit, and the braking performance on ice was inferior compared to Comparative Example 1.

Comparative Example 3 is an example where a polyisoprene was used as a liquid polymer, and the braking performance on ice was inferior compared to Comparative Example 1.

Comparative Example 4 is an example where a polybutadiene having a glass transition temperature outside the predetermined range was used as a liquid polymer, and the braking performance on ice and Failure Properties 1 and 2 were inferior compared to Examples 2 and 5.

The rubber composition for tires of the invention can be used for various tires for passenger cars, light trucks, buses, and the like.

What is claimed is:

1. A rubber composition for tires, consisting of:
   100 parts by mass of a solid rubber component,
   1 to 20 parts by mass of a liquid polybutadiene having a glass transition temperature of −80° C. or less,
   1 to 30 parts by mass of vegetable granules having a particle size of 0.1 to 500 μm,
   10 to 150 parts by mass of carbon black and/or silica,
   0.1 to 4 parts by mass of a vulcanizing agent,
   0.1 to 7 parts by mass of a vulcanization accelerator, and
   optionally at least one selected from the group consisting of a silane coupling agent, a zinc oxide, a stearic acid, a plasticizer, a wax, a resin, and an antioxidant.

2. The rubber composition for tires according to claim 1, wherein the liquid polybutadiene has a weight average molecular weight of 5,000 to 50,000.

3. The rubber composition for tires according to claim 1, wherein the liquid polybutadiene has a microstructure having a cis-structure content of 40 mass % or less and a trans-structure content of 50 mass % or more.

4. The rubber composition for tires according to claim 2, wherein the liquid polybutadiene has a microstructure having a cis-structure content of 40 mass % or less and a trans-structure content of 50 mass % or more.

TABLE 1

|  | Comparative Example 1 | Comparative Example 2 | Comparative Example 3 | Comparative Example 4 | Example 1 | Example 2 | Example 3 | Example 4 | Example 5 |
|---|---|---|---|---|---|---|---|---|---|
| Natural Rubber | 60 | 60 | 60 | 60 | 60 | 60 | 60 | 60 | 60 |
| Butadiene Rubber | 40 | 40 | 40 | 40 | 40 | 40 | 40 | 40 | 40 |
| Carbon Black | 50 | 50 | 50 | 50 | 50 | 50 | 50 | 50 | 50 |
| Zinc Oxide | 3 | 3 | 3 | 3 | 3 | 3 | 3 | 3 | 3 |
| Stearic Acid | 1 | 1 | 1 | 1 | 1 | 1 | 1 | 1 | 1 |
| Vegetable Granules 1 | 3 | 3 | 3 | 3 | 3 | 3 | 3 | 3 | 3 |
| Vegetable Granules 2 | 2 | 2 | 2 | 2 | 2 | 2 | 2 | 2 | 2 |
| Aromatic Oil | 2 | — | — | — | — | — | — | — | — |
| Liquid Polymer 1 | — | 30 | — | — | 1 | 5 | 10 | 20 | — |
| Liquid Polymer 2 | — | — | — | — | — | — | — | — | 5 |
| Liquid Polymer 3 | — | — | 5 | — | — | — | — | — | — |
| Liquid Polymer 4 | — | — | — | 5 | — | — | — | — | — |
| Antioxidant | 1 | 1 | 1 | 1 | 1 | 1 | 1 | 1 | 1 |
| Sulfur | 1 | 1 | 1 | 1 | 1 | 1 | 1 | 1 | 1 |
| Vulcanization Accelerator | 2 | 2 | 2 | 2 | 2 | 2 | 2 | 2 | 2 |
| Braking Performance on Ice | 100 | 85 | 98 | 101 | 103 | 108 | 110 | 110 | 105 |
| Failure Property 1 | 100 | 120 | 109 | 104 | 105 | 120 | 107 | 115 | 111 |
| Failure Property 2 | 100 | 117 | 110 | 102 | 107 | 127 | 123 | 120 | 117 |

The results are as shown in Table 1. From the comparison between Examples 1 to 5 and Comparative Example 1, it can be seen that Examples 1 to 5 are superior in terms of braking performance on ice and Failure Properties 1 and 5. The rubber composition for tires according to claim 1, wherein the solid rubber component contains 40 to 80 mass % of natural rubber or isoprene rubber and 20 to 60 mass % of butadiene rubber.

6. The rubber composition for tires according to claim 2, wherein the solid rubber component contains 40 to 80 mass % of natural rubber or isoprene rubber and 20 to 60 mass % of butadiene rubber.

7. The rubber composition for tires according to claim 3, wherein the solid rubber component contains 40 to 80 mass % of natural rubber or isoprene rubber and 20 to 60 mass % of butadiene rubber.

8. A pneumatic tire comprising the rubber composition for tires according to claim 1 in a tread.

9. A pneumatic tire comprising the rubber composition for tires according to claim 2 in a tread.

10. A pneumatic tire comprising the rubber composition for tires according to claim 3 in a tread.

11. A pneumatic tire comprising the rubber composition for tires according to claim 4 in a tread.

12. A pneumatic tire comprising the rubber composition for tires according to claim 5 in a tread.

13. A pneumatic tire comprising the rubber composition for tires according to claim 6 in a tread.

14. A pneumatic tire comprising the rubber composition for tires according to claim 7 in a tread.

* * * * *